May 9, 1961
YOSHIHISA MAITANI
2,983,205
MECHANISM ASSOCIATED WITH EXPOSURE METER FOR
CONTROLLING THE DIAPHRAGM IN THE CAMERA
EQUIPPED WITH INTERCHANGEABLE LENS
Filed Dec. 26, 1957
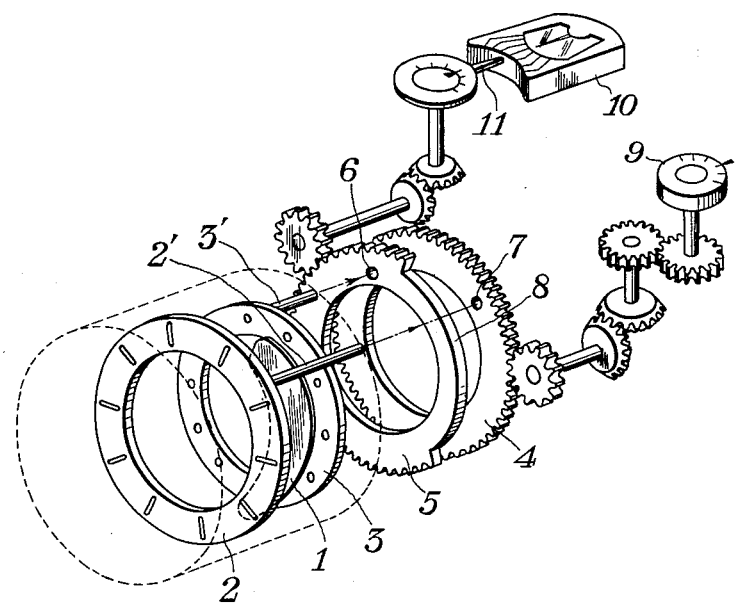

United States Patent Office 2,983,205
Patented May 9, 1961

2,983,205

MECHANISM ASSOCIATED WITH EXPOSURE METER FOR CONTROLLING THE DIAPHRAGM IN THE CAMERA EQUIPPED WITH INTERCHANGEABLE LENS

Yoshihisa Maitani, 3170 Osachi, Okaya, Japan

Filed Dec. 26, 1957, Ser. No. 705,264

Claims priority, application Japan Dec. 29, 1956

2 Claims. (Cl. 95—10)

This invention relates to a photographic camera equipped with an interchangeable lens mount and a behind-the-lens, or screen, shutter, and particularly to a mechanism operative in association with an exposure meter for automatically setting the devices for controlling the diaphragm aperture and exposure time in such relative positions adapted to obtain a proper and accurate exposure.

An object of the invention is to provide a mechanism which is simple in construction, economical to manufacture, can be readily assembled, and is reliable in operation.

Other and further objects of the invention will be obvious upon an understanding of the illustrative embodiment about to be described with reference to the accompanying drawing, which shows an exploded perspective view of the mechanism according to this invention.

Referring to the drawing, the part schematically shown in dotted lines is a lens drum of an interchangeable lens assembly. The lens system is not shown and described in detail, as it forms no part of the invention. It is to be noted that there is provided a diaphragm in said lens system as usual. For the sake of clarity, only a single blade of the diaphragm is shown as at 1. In the existing interchangeable lens assembly, one end of the diaphragm blade is pivoted to a part integral with the lens drum and the other end is pivoted to a ring which is rotatable relative to the lens drum. In the device according to this invention, the two ends of each blade 1 are supported by two rings, respectively. These two rings are rotatable relative to each other and to the lens drum, the arrangement being such that the diaphragm aperture may be varied according to the rotation of either or both of said rings 2 and 3 relative to the lens drum. The diaphragm is made in a so-called uniform system, and the aperture area is varied proportional to the relative rotational angle of the rings 2 and 3. One of the rings 2 and 3 has on its periphery a uniform or linear diaphragm scale, and the other is provided with an indicator reading on said scale. For the sake of convenience, here, the ring 2 is termed a "diaphragm ring," while the ring 3 is termed a "light-value ring." The rings 2 and 3 have fixed connecting rods 2' and 3', respectively, and the other ends of said connecting rods extend backwardly beyond the inner end of the lens drum for some length.

The camera body (not shown) has on its front wall a socket for receiving the interchangeable lens element or unit as usual. A bayonet mount or the like is preferable for this purpose. Within the camera body, behind the socket, there are controlling members consisting of ring gears 4 and 5 rotatable around the optical axis of the lens unit. These gears are supported in juxtaposition. The ring gears 4 and 5 are provided with holes 6 and 7, respectively, adapted to receive the free ends of the connecting rods 2' and 3', respectively, when the lens assembly is mounted to the camera body. The front ring gear 5 is provided with a circumferential recessed portion 8 having no teeth, so that any interference by the rod 2' is avoided. A set dial 9 is provided for adjusting the exposure time or shutter speed of the screen shutter or behind-the-lens shutter. The axis of the dial 9 is operatively connected to said ring gear 4 through a gear train or suitable intermediate transmission mechanism as shown. The set dial 9 is of the type which does not rotate during the operation of the shutter, and it has uniform shutter-speed markings. An indicator 11 is adapted for following up the position of the pointer of a built-in exposure meter 10, and the axis of the indicator 11 is operatively connected to or interlocked with the ring gear 5 through a gear train or other intermediate transmission mechanism in the manner shown in the drawing. The indicator 11 need not necessarily be fixed to its axis, but it is preferable that there may be provided a rotatable scale disc having a sliding resistance for adjusting the position of the indicator according to the sensitiveness of the sensitive film used or to the filter factor between the indicator and its axis.

If the set dial 9 for adjusting the exposure time is rotated the diaphragm ring 2 associated therewith will also be rotated, but in this case the amount of light which is determined by the combination of the exposure time and the corresponding diaphragm area will not be varied, provided that the light-value ring 3 stands stationary. It is the rotation of said light-value ring 3 that exerts an influence upon the amount of light, it is possible by selecting the transmission ratio between the indicator 11 and the gear 5 to set the light-value ring 3 in desired position according to the brightness of the subject by rotating the light-value ring 3 to bring the indicator 11, following up to the movement of the exposure meter pointer. In handling the camera equipped with the mechanism according to this invention, the camera is set against the subject after bringing the reading of the scale on the set dial 9 in coincidence with the desired reading of the scale on the camera body. Then, the light-value ring 3 is rotated to bring the indicator 11 in coincidence with the position of the exposure meter. By pressing the shutter button or lever in such position, an accurate exposure may be made.

It will be noted that according to the present invention, in the camera employing the interchangeable lens assembly in which a screen shutter or behind-the-lens shutter is provided, it is possible to automatically determine the proper combination of diaphragm aperture and shutter time for proper exposure on the basis of the reading of the exposure meter built in or combined with the camera, so that the camera may readily be set for proper exposure.

While in the embodiment illustrated in the drawing the indicator 11 is arranged to follow up the pointer of the exposure meter, an alternative embodiment may be adopted in which the exposure meter per se is rotatably supported in the camera body in such manner that the exposure meter may be rotated through any means from the gear 5, so that the pointer of the exposure meter is brought into coincidence with the desired reading of the scale or markings on the camera body.

What I claim is:

1. In a photographic camera having a removable lens unit mountable on the camera and having a shutter, the combination of an exposure meter, a first and a second juxtapositioned ring members in said lens unit, a first and a second juxtapositioned ring gears in the camera, in operation said ring members and ring gears being disposed substantially coaxial with the optical axis of the lens unit and rotatable about said axis, means for operatively and releasably connecting the first ring gear with said first ring member when the lens unit is selectively mounted on the camera and disconnectable upon removal of the lens unit from the camera, means for operatively and releasably connecting the second ring gear to the second ring member when the lens unit is selectively mounted on the camera and disconnectable upon removal of the lens unit from the camera, a diaphragm assembly in said lens unit operable to vary an opening therein for effecting an exposure including blades fixed to said two ring members operable to relative angular positions to vary the area of said opening as a function of relative rotation of said ring members, shutter-speed setting means in said camera operatively connected to said first ring gear for setting the shutter speed and simultaneously angularly positioning the first ring member in a set position, means in said camera operatively connected to said second ring gear to set the extent of relative angular rotation of the second ring member relative to the first ring member as a function of the light value readings readable on the exposure meter.

2. In a photographic camera having a removable lens unit mountable on the camera and having a shutter, the combination of an exposure meter, a first and a second juxtapositioned ring members in said lens unit, a first and a second juxtapositioned ring gears in the camera, in operation said ring members and ring gears being disposed substantially coaxial with the optical axis of the lens unit and rotatable about said axis, a first connecting rod fixed to said first ring member and extending axially substantially parallel to said axis for operatively and releasably connecting the first ring gear with said first ring member when the lens unit is selectively mounted on the camera and disconnectable from the first ring gear upon removal of the lens unit from the camera, said first ring gear having an opening for releasably receiving said first connecting rod, a second connecting rod fixed to the second ring member and extending substantially parallel to said axis for operatively and releasably connecting the second ring gear to the second ring member when the lens unit is selectively mounted on the camera and disconnectable from the second ring member upon removal of the lens unit from the camera, said second ring gear having an opening for releasably receiving said second connecting rod, a diaphragm assembly in said lens unit operable to vary an opening therein for effecting an exposure including blades fixed to said two ring members operable to relative angular positions to vary the area of said opening as a function of relative rotation of said ring members, shutter-speed setting means on said camera operatively connected to said first ring gear for setting the shutter speed and simultaneously angularly positioning the first ring member in a set position, means in said camera operatively connected to said second ring gear to set the extent of relative angular rotation of the second ring member relative to the first ring member as a function of the light value readings readable on the exposure meter.

References Cited in the file of this patent

UNITED STATES PATENTS

| 2,209,156 | Fischer | July 23, 1940 |

FOREIGN PATENTS

| 147,573 | Austria | Nov. 10, 1936 |
| 179,192 | Austria | July 26, 1954 |